US007519852B2

(12) United States Patent
Carver et al.

(10) Patent No.: US 7,519,852 B2
(45) Date of Patent: Apr. 14, 2009

(54) APPARATUS, SYSTEM, AND METHOD FOR REDIRECTING AN INSTRUCTION POINTER TO RECOVERY SOFTWARE INSTRUCTIONS

(75) Inventors: Brian Luther Carver, Raleigh, NC (US); Inderjeet Rampal Soneja, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 11/128,142

(22) Filed: May 12, 2005

(65) Prior Publication Data

US 2006/0259736 A1    Nov. 16, 2006

(51) Int. Cl.
*G06F 11/00* (2006.01)
(52) U.S. Cl. .......................................... 714/6; 711/220
(58) Field of Classification Search .................. 714/6, 714/35; 711/220
See application file for complete search history.

(56) References Cited

U.S. PATENT DOCUMENTS

| 3,576,982 | A | * | 5/1971 | Duke ............................... 714/6 |
| 4,945,535 | A | * | 7/1990 | Hosotani et al. ................ 714/8 |
| 5,140,593 | A | * | 8/1992 | Hayashi ........................ 714/31 |
| 5,396,619 | A | | 3/1995 | Walton ........................ 398/575 |
| 5,479,611 | A | * | 12/1995 | Oyama ........................ 714/48 |
| 5,870,537 | A | | 2/1999 | Kern et al. ............. 395/182.04 |
| 6,119,208 | A | | 9/2000 | White et al. ................. 711/162 |
| 6,119,245 | A | * | 9/2000 | Hiratsuka ....................... 714/7 |
| 6,195,695 | B1 | | 2/2001 | Cheston et al. ............. 709/221 |
| 6,480,970 | B1 | | 11/2002 | DeKoning et al. ............. 714/6 |
| 6,553,510 | B1 | | 4/2003 | Pekny ............................ 714/6 |
| 6,684,396 | B1 | | 1/2004 | Brittain et al. .............. 717/168 |
| 6,687,849 | B1 | | 2/2004 | Cherf ............................ 714/5 |
| 6,715,051 | B2 | * | 3/2004 | Iwamura et al. ............. 711/165 |
| 6,820,182 | B1 | * | 11/2004 | Bauman et al. ............. 711/170 |
| 7,017,017 | B2 | * | 3/2006 | Dahlen et al. ............... 711/157 |
| 7,058,782 | B2 | * | 6/2006 | Henderson et al. .......... 711/170 |
| 7,246,257 | B2 | * | 7/2007 | Lai et al. ........................ 714/6 |
| 7,287,138 | B2 | * | 10/2007 | Bland et al. ................. 711/162 |
| 7,389,458 | B2 | * | 6/2008 | Bacigalupo ................. 714/733 |
| 2001/0039632 | A1 | * | 11/2001 | MacLaren et al. ............. 714/6 |
| 2005/0138465 | A1 | * | 6/2005 | Depew et al. .................. 714/5 |

FOREIGN PATENT DOCUMENTS

JP          4170647       6/1992

OTHER PUBLICATIONS

D. D. Streicher, "Synchronization of Memory Dumps to a Template", IBM Technical Disclosure Bulletin vol. 29 No. 11 Apr. 1987.

* cited by examiner

*Primary Examiner*—Robert Beausoliel
*Assistant Examiner*—Joshua P Lottich
(74) *Attorney, Agent, or Firm*—Kunzler & McKenzie (57) ABSTRACT

An apparatus, system, and method are disclosed for redirecting an instruction pointer to recovery software instructions. A load module copies a first and second process to memory locations addressed by a first and second base address. An instruction pointer module addresses a memory location with an address comprising a pointer base address set to the first base address and an offset. A pointer modification module modifies the pointer base address from the first base address to the second base address in response to a read error to redirect the instruction pointer module to a memory location of the second process.

17 Claims, 7 Drawing Sheets

APPARATUS, SYSTEM, AND METHOD FOR REDIRECTING AN INSTRUCTION POINTER TO RECOVERY SOFTWARE INSTRUCTIONS

BACKGROUND OF THE INVENTION

1. Field of the Invention

This invention relates to redirecting an instruction pointer and more particularly relates to redirecting an instruction pointer to execute recovery software instructions.

2. Description of the Related Art

Data processing devices ("DPD") such as computers, servers, personal digital assistants, embedded controllers, and the like typically store software instructions and data, herein referred to collectively as software instructions, in memory. Memory may include dynamic random access memory ("DRAM"), static random access memory ("SRAM"), read only memory ("ROM"), Flash random access memory ("Flash RAM"), and the like.

The DPD also typically includes a processor module. The processor module retrieves or reads software instructions from the memory. The software instructions direct the operation of the processor module. The processor module cannot function without the proper software instructions.

In one embodiment, the processor module includes an instruction pointer module that is configured to address a memory location. The processor module may read a first software instruction from the address of the instruction pointer module. In addition, the processor module may increment the address of the instruction pointer after reading the first software instruction to a subsequent second software instruction or may write a new address to the instruction pointer module as directed by the first software instruction.

Unfortunately, software instructions may be stored to an inoperative or bad memory location. The bad memory location cannot store and retrieve a valid software instruction. As a result, a processor module reading a software instruction from a bad memory has a read error and may cease to function properly or hang.

A DPD often executes memory diagnostics to detect bad memory before software instructions are stored in the bad memory. Unfortunately, the DPD may load the memory diagnostics into bad memory, resulting in the DPD hanging during the memory diagnostics and preventing the detection of the bad memory.

From the foregoing discussion, it should be apparent that a need exists for an apparatus, system, and method that redirects the instruction pointer module of a DPD to valid software instructions if a read error occurs. Beneficially, such an apparatus, system, and method would enable a DPD to recover from reading a software instruction from bad memory.

SUMMARY OF THE INVENTION

The present invention has been developed in response to the present state of the art, and in particular, in response to the problems and needs in the art that have not yet been fully solved by currently available read error recovery methods. Accordingly, the present invention has been developed to provide an apparatus, system, and method for redirecting an instruction pointer to recovery software instructions that overcome many or all of the above-discussed shortcomings in the art.

The apparatus to redirect an instruction pointer is provided with a logic unit containing a plurality of modules configured to functionally execute the necessary steps of copying a first and second process with a first and second base address, addressing a memory location with a pointer base address set to the first base address, and modifying the pointer base address from the first base address to the second base address. These modules in the described embodiments include a load module, an instruction pointer module, and a pointer modification module.

The load module copies a first and second process to memory locations. Each process comprises software instructions. In one embodiment, the software instructions of the second process are identical to the software instructions of the first process. In an alternate embodiment, the second process may differ from the first process. In a certain embodiment, the second process is configured as a recovery process for the first process.

The load module copies the first and second process to memory locations addressed by a first and second base address. In one embodiment, the load module copies a plurality of processes including the first and second process to memory locations each addressed by one of a plurality of base addresses. In a certain embodiment, the base address of each process is an integer multiple of a specified address from the first base address.

The instruction pointer module addresses a memory location with an address. The address comprises a pointer base address and an offset. The pointer base address is set to the first base address. The instruction pointer module directs the reading of a software instruction from the address formed by the pointer base address and the offset.

The pointer modification module modifies the pointer base address from the first base address to the second base address in response to a first read error. Modifying the pointer base address redirects the instruction pointer module to read software instructions from the second process, allowing a recovery from the first read error reading the software instructions of the first process. In one embodiment, the pointer modification module may further modify the pointer base address from the second base address to a third base address of the plurality of base addresses in response to a second read error. The apparatus redirects the instruction pointer module to one or more processes comprising recovery software instructions.

A system of the present invention is also presented to redirect an instruction pointer. The system may be embodied in a DPD. In particular, the system, in one embodiment, includes memory module, a processor module, a load module, and a pointer modification module.

The memory module stores and retrieves software instructions in a plurality of memory locations. Each memory location is addressed by a unique address. The memory module may comprise DRAM, SRAM, ROM, Flash RAM, or the like.

The processor module executes the software instructions stored in the memory module. In addition, the processor module includes an instruction pointer module. The processor module reads the software instruction in the memory module addressed by the instruction pointer module. The instruction pointer module forms the address from a pointer base address and the offset.

The load module copies a first and second process to memory locations addressed by a first and second base address. The pointer base address is set to the first base address. The pointer modification module modifies the pointer base address from the first base address to the second base address in response to a read error. The system redirects the instruction pointer module to recovery software instructions such as an identical copy of the first process.

A method of the present invention is also presented for redirecting an instruction pointer. The method in the disclosed embodiments substantially includes the steps necessary to carry out the functions presented above with respect to the operation of the described apparatus and system. In one embodiment, the method includes copying a first and second process with a first and second base address, addressing a memory location with a pointer base address set to the first base address, and modifying the pointer base address from the first base address to the second base address.

A load module copies a first and second process to memory locations addressed by a first and second base address. An instruction pointer module addresses a memory location with an address comprising a pointer base address set to the first base address and an offset. A pointer modification module modifies the pointer base address from the first base address to the second base address in response to a read error. The method allows the recovery from a read error by redirecting the instruction pointer module to the second process. The second process may be identical to the first process, or a unique recovery process.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention redirects an instruction pointer module from a first process to a second process in response to a read error. In addition, the present invention allows the execution of recovery software instructions such as redundant software instructions. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
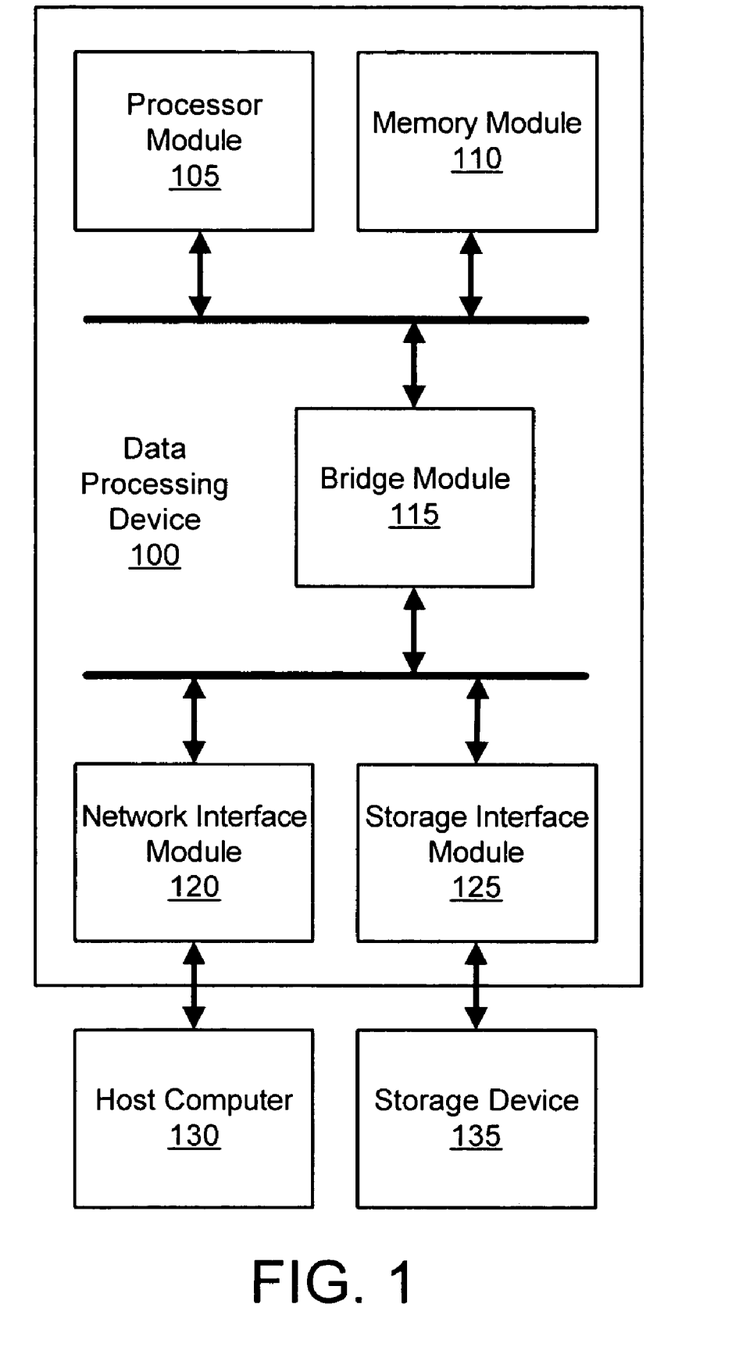
FIG. 1 is a schematic block diagram illustrating one embodiment of a Data Processing Device in accordance with the present invention.

FIG. 1 is a schematic block diagram illustrating one embodiment of a DPD 100 in accordance with the present invention. The DPD 100 includes a processor module 105, a memory module 110, a bridge module 115, a network interface module 120, and a storage interface module 125. In addition, the DPD 100 is depicted in communication with a host computer 130, and a storage device 135.

The processor module 105, memory module 110, bridge module 115, network interface module 120, and storage interface module 125 may be fabricated of semiconductor gates on one or more semiconductor substrates. Each semiconductor substrate may be packaged in one or more semiconductor devices mounted on circuit cards. Connections between the processor module 105, the memory module 110, the bridge module 115, the network interface module 120, and the storage interface module 125 may be through semiconductor metal layers, substrate to substrate wiring, or circuit card traces or wires connecting the semiconductor devices.

The memory module 110 stores software instructions. The processor module 105 executes the software instructions as is well know to those skilled in the art. The processor module 105 communicates with the network interface module 120 and the storage interface module 125 through the bridge module 115.

Figure 2:
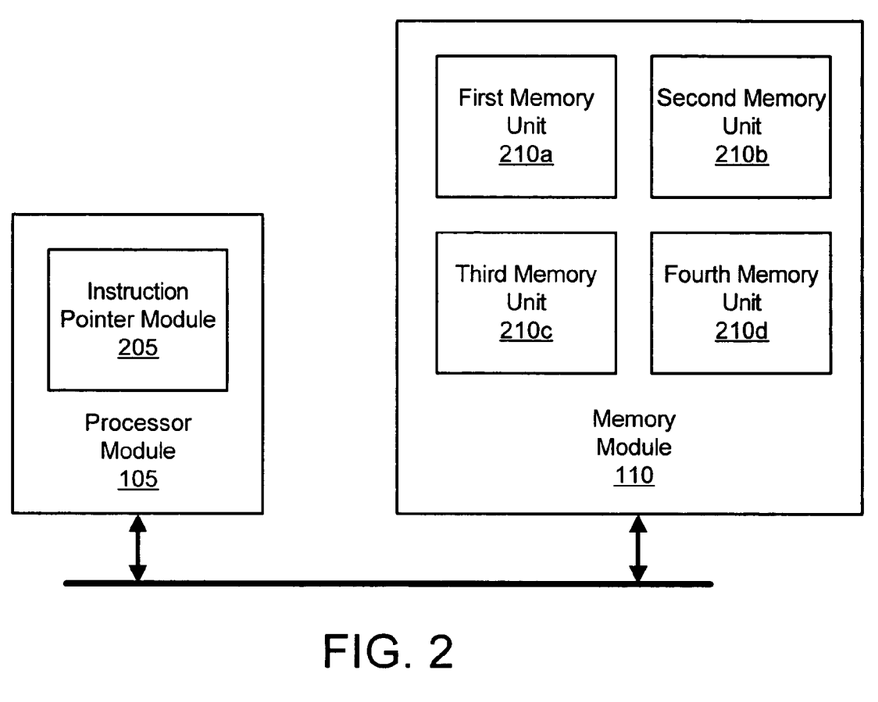
FIG. 2 is a schematic block diagram illustrating one embodiment of a processor subsystem of the present invention.

FIG. 2 is a schematic block diagram illustrating one embodiment of a processor subsystem 200 of the present invention. The subsystem 200 depicts the processor module 105 of FIG. 1 in communication with the memory module 110 of FIG. 1.

The memory module 110 stores and retrieves software instructions in a plurality of memory locations. The memory module is depicted with four memory units 210, although the memory module 110 may contain any number of memory units 210. Each memory unit 210 comprises a plurality of memory locations, each addressed by a unique address. Each memory unit 210 may comprise DRAM, SRAM, ROM, Flash RAM, or the like.

The processor module 105 includes an instruction pointer module 205. The instruction pointer module forms an address from a pointer base address and the offset. The processor module 105 reads the software instruction addressed by the instruction pointer module 205 from the memory module 110. In addition, the processor module 105 executes the software instructions read from the memory module 110.

If the processor module 105 reads a software instruction from a bad memory location, the processor module 105 will not function properly, and may cease to function. To prevent the processor module 105 from reading from bad memory, a diagnostic process may be executed to detect and isolate bad memory locations. The diagnostic process may mark bad memory locations so that the processor module does not store software instructions to or read software instructions from the bad memory locations. Unfortunately, the diagnostic process may load into one or more memory locations that include bad memory, preventing the diagnostic process from detecting and isolating the bad memory. In addition, because the memory units 210 may be interleaved with a single unique address addressing portions of one or more memory units 210, a bad memory unit 210 may corrupt a significant portion of the memory module 110.

Figure 3:
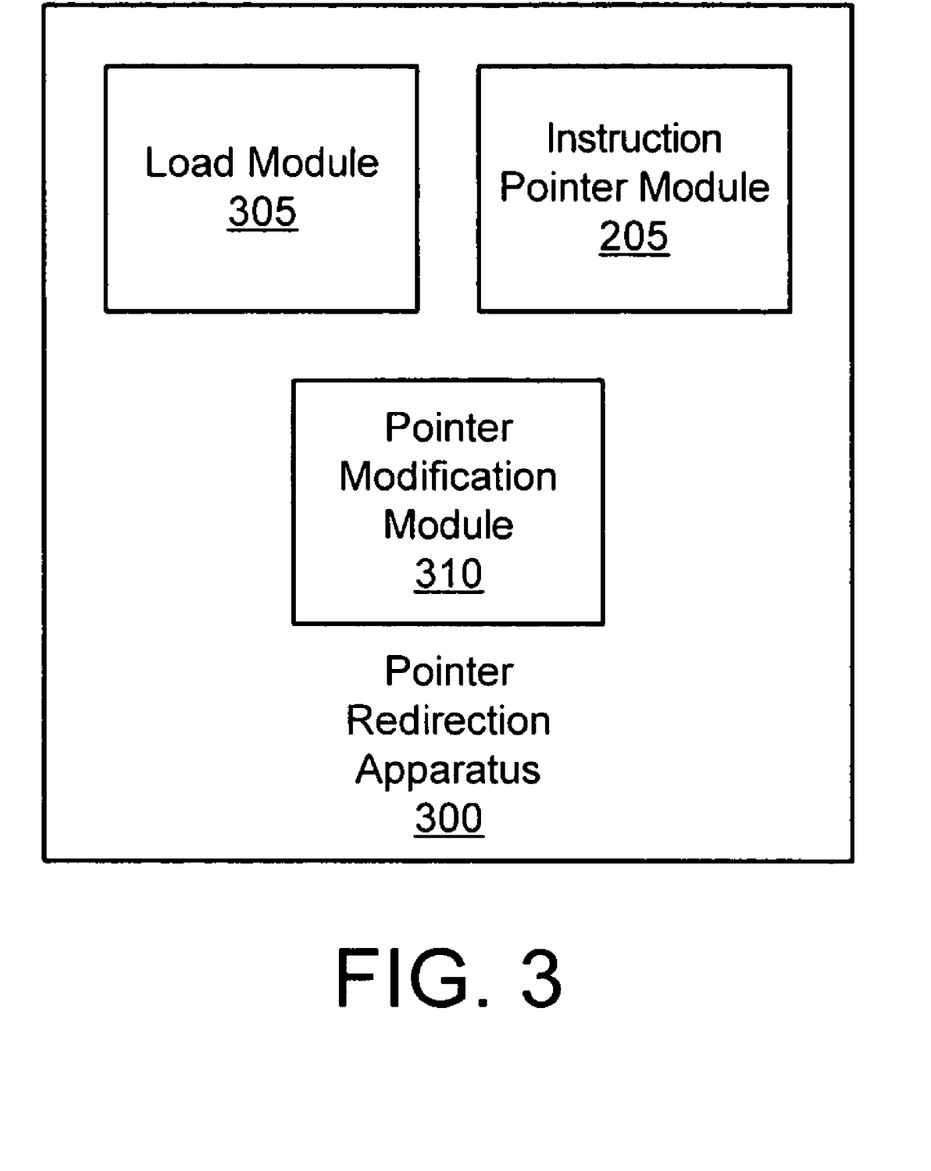
FIG. 3 is a schematic block diagram illustrating one embodiment of a pointer redirection apparatus of the present invention.

FIG. 3 is a schematic block diagram illustrating one embodiment of a pointer redirection apparatus 300 of the present invention. In one embodiment, the apparatus 300 is comprised by the processor module 105 and memory module 110 of FIGS. 1 and 2. The apparatus 300 includes a load module 305, an instruction pointer module 205, and a pointer modification module 310. In a certain embodiment, the instruction pointer module 205 is the instruction pointer module 205 of FIG. 2.

The load module 305 copies a first and second process to memory locations in the memory module 110. Each process comprises a plurality of software instructions. In one embodiment, the software instructions of the second process are identical to the software instructions of the first process. For example, the first and second processes may be identical instances of a diagnostic process. The first and second processes may each be configured to test the memory module 110 for bad memory locations, and to isolate any bad memory locations by marking the bad memory locations.

In an alternate embodiment, the second process may differ from the first process. For example, the second process may be a recovery process for the first process. The recovery process may be configured to execute a data protection routine, a memory diagnostic, a processor diagnostic, or the like.

The load module 305 copies the first and second process to memory locations addressed by a first and second base address. For example, the first base address may address the first software instruction in the first process and the second base address may address the first software instruction in the second process. In one embodiment, the load module 305 copies a plurality of processes including the first and second process to memory locations each addressed by one of a plurality of base addresses.

In one embodiment, the base address of each process is an integer multiple of a specified address from the first base address. For example, the load module 305 may store the first process at a memory location with the hexadecimal address '100x', the second process at a memory location with the hexadecimal address '200x', and the third process at the hexadecimal address '300x'.

The instruction pointer module 205 addresses a memory location with an address. The address comprises a pointer base address and an offset. In one embodiment, the instruction pointer module 205 includes a register for the pointer base address and a register for the offset. The pointer base address register and the offset register are summed to form the address. The address may also reside in a separate register. In an alternate embodiment, the pointer base address and the offset are summed and stored in a single register.

The pointer base address is set to the first base address of the first process. The instruction pointer module 205 directs the reading of a software instruction from the address formed by the pointer base address and the offset. In addition, the instruction pointer module 205 may increment or modify the address to read a plurality of software instructions comprising the first process. For example, the instruction pointer module 205 may modify the address subsequent to reading a first software instruction by incrementing the address such that the address addresses a second software instruction contiguous with the first software instruction.

The pointer modification module 310 modifies the pointer base address from the first base address to the second base address in response to a first read error. For example, if the processor module 105 attempts to read a software instruction from a first memory location and the first memory location is bad, the processor module 105 may detect a read error. In one embodiment, the processor module 105 detects the read error if the software instruction of the first memory location is invalid. In an alternate embodiment, the processor module 105 detects the read error if the error correction code for the first memory location is invalid.

The pointer modification module 310 modifies the pointer base address from the first base address to the second base address in response to the read error and the processor module 105 reads a software instruction from a third memory location addressed by the second base address and the offset instead of a memory location addressed by the first base address and the offset. The software instruction of the third memory location is a recovery software instruction. In one embodiment, the software instruction of the third memory location is identical to software instruction of the first memory location.

In one embodiment, the pointer modification module 310 may further modify the pointer base address from the second base address to a third base address of the plurality of base addresses in response to a second read error. For example, if the first memory location addressed by the first base address and the offset and the third memory location addressed by second base address and the offset are both bad memory locations, the pointer modification module 310 may modify the pointer base address to the third base address and address a fourth memory location. The apparatus 300 redirects the instruction pointer module 205 to recovery software instructions such as redundant software instructions in response to a read error, allowing a DPD 100 to continue operation.

Figure 4:
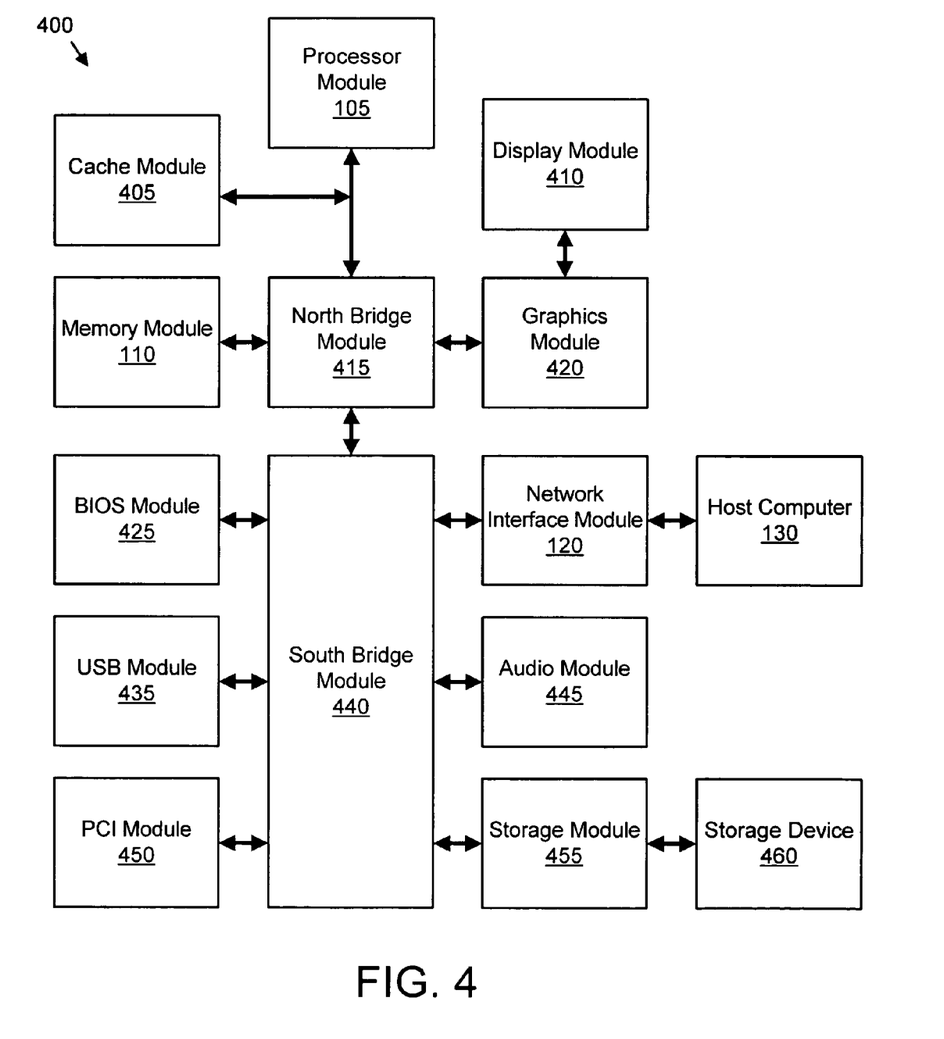
FIG. 4 is a schematic block diagram illustrating one embodiment of an alternate DPD of the present invention.

FIG. 4 is a schematic block diagram illustrating one embodiment of an alternate DPD 400 of the present invention. The DPD 400 comprises the pointer redirection apparatus 300 of FIG. 3. The DOD 400 includes a processor module 105, a cache module 405, a display module 410, a memory module 110, a north bridge module 415, a graphics module 420, a basic input/output system ("BIOS") module 425, a network interface module 125, a universal serial bus ("USB") module 435, a south bridge module 440, an audio module 445, a peripheral component interconnect ("PCI") module 450, and a storage module 455. In a certain embodiment, the processor module 105 and memory module 110 are the processor module 105 and memory module 110 of FIGS. 1 and 2.

The north bridge module 415 and south bridge module 440 maintain communications among the modules of the DPD 400. In addition, the graphics module 420 and display module 410 may output images, and the network interface module 125, USB module 435, audio module 445, PCI module 450, and storage module 445 may communicate with other devices as is well known by those skilled in the art.

The BIOS module 425 stores software instructions for initializing the DPD 400 and loading additional software instructions such as an operating system from a storage device 460. The BIOS module 425 may be configured as nonvolatile memory such as Flash RAM containing the software instructions. In one embodiment, the BIOS module 425 comprises the load module 305 and pointer modification module 310 of FIG. 3. The load module 305 copies one or more processes such as a plurality of identical memory diagnostic process instances to memory locations in the memory module 110, with each process loaded at a unique base address. The pointer base address of an instruction pointer module 205 is set to a first base address and the processor module 105 executes a first process instance, but if the processor module 105 detects a read error, the pointer modification module 310 modifies the pointer base address to a second base address of a second instance of the process. Thus the memory diagnostic process continues to function although the first process instance was loaded into memory that included a bad memory location.

A host computer 130 may communicate with the DPD through the network interface module 120. In one embodiment, the host computer 130 comprises the load module 305 of FIG. 3. In addition, the host computer 130 may load the pointer modification module 310 as software instructions in the memory module 110. The load module 305 copies one or more processes such as a first operational process and a second recovery process to memory locations in the memory module 110, with each process loaded at a unique base address. The processor module 105 executes the first operational process with the pointer base address of the instruction pointer module 205 set to a first base address of the first operational process, but if there is a read error, the pointer modification module 310 modifies the pointer base address to a second base address of a second recovery process. The recovery process may communicate with the host computer 130 to facilitate the recovery of the DPD 400.

An operating system may execute on the processor module 105, with software instructions stored in the memory module 110 and the storage device 460. In one embodiment, the operating system may comprise the load module 305 and the pointer modification module 310. The DPD 400 redirects the instruction pointer module 205 by modifying the pointer base address to execute recovery software such as redundant software.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
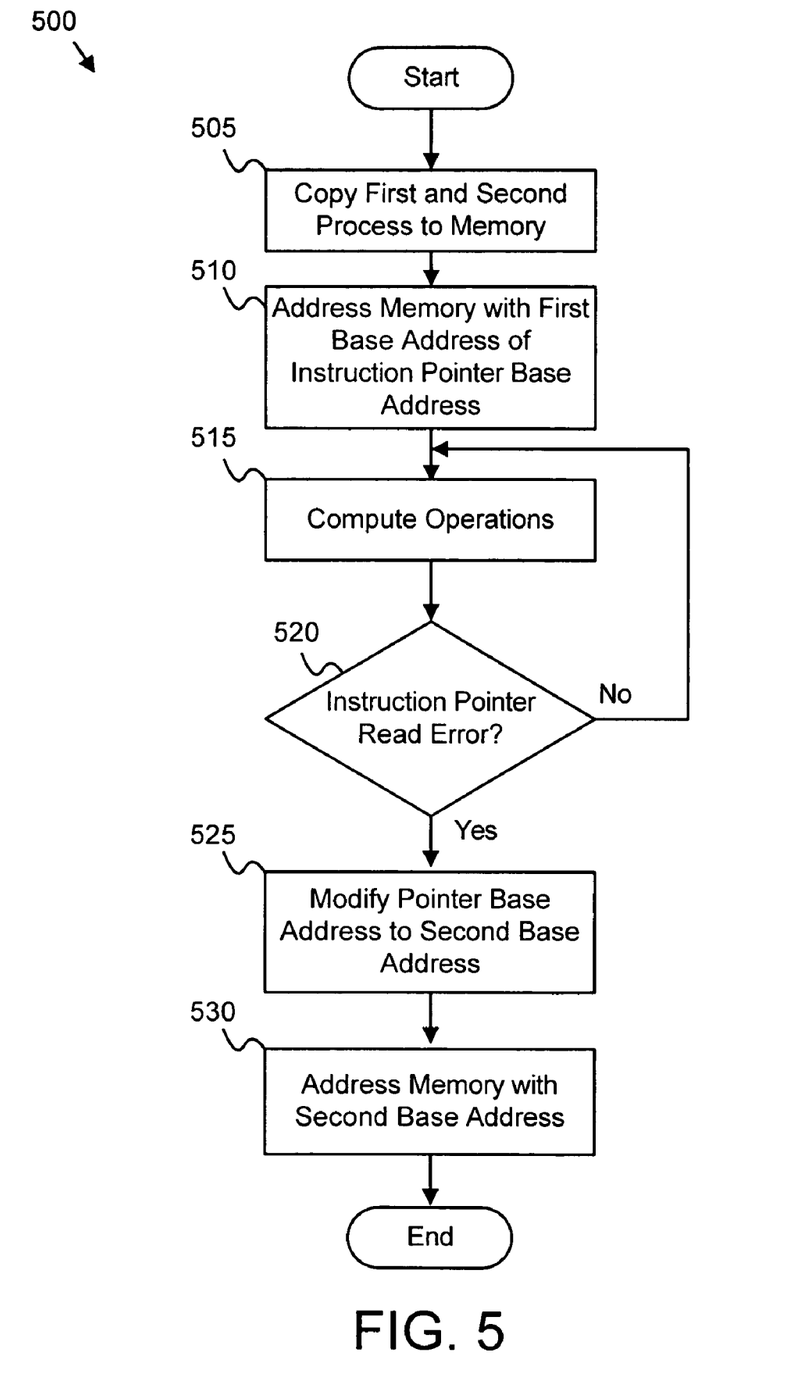
FIG. 5 is a schematic flow chart diagram illustrating one embodiment of a pointer redirection method of the present invention.

FIG. 5 is a schematic flow chart diagram illustrating one embodiment of a pointer redirection method 500 of the present invention. The method substantially includes the steps necessary to carry out the functions presented above with respect to the operation of the described DPD 100 in FIG. 1, the processor subsystem 200 in FIG. 2, the pointer redirection apparatus 300 of FIG. 3, and the alternate DPD of FIG. 4.

The method begins and a load module 305 copies 505 a first and second process to memory locations in a memory module 110 addressed by a first and second base address. In one embodiment, the load module 305 copies 505 the first and second process to pre-specified memory locations. In an alternate embodiment, the load module 305 copies 505 the first and second process to memory locations with sufficient contiguous available memory locations for a process and further records the base addresses of a predetermined portion of the memory locations such as the memory location with the numerically lowest address. For example, the load module 305 may copy the first process to the hexadecimal memory locations '100x' through '1F0x', copy the second process to the hexadecimal memory locations '200x' through '2F0x' and record the first base address as '100x' and the second base address as '200x'.

An instruction pointer module 205 addresses 310 a memory location with an address comprising a pointer base address set to the first base address and an offset. The offset may initially be set to zero (0). In one embodiment, the pointer base address addresses a memory block and the offset addresses memory locations within the memory block. Equation 1 details the calculation of the address of the instruction pointer module 205 where $a_k$ is the current address, $b_1$ is the first base address and o is the offset.

$$a_k = b_1 + o \quad \text{Equation 1}$$

In one embodiment, a processor module 105 computes 515 one or more operations comprising software instructions beginning with the address of the instruction pointer module 205. A pointer modification module 310 determines 520 if there is a read error. If the pointer modification module 310 determines 520 there is no read error, the processor module 105 continues computing 515 operations. If the pointer modification module 310 determines 520 there is a read error, the pointer modification module 310 modifies 525 the pointer base address from the first base address to the second base address in response to a read error. In one embodiment, the pointer modification module 310 modifies 525 the instruction pointer module 205 using Equation 2 where $b_2$ is the second base address.

$$a_k = a_k - b_1 + b_2 \quad \text{Equation 2}$$

In an alternate embodiment, the pointer modification module 310 modifies the instruction pointer module 205 to the second base address as illustrated by Equation 3.

$$a_k = b_2 \quad \text{Equation 3}$$

In one embodiment, the pointer modification module 310 comprises an interrupt. The processor module 105 may assert the interrupt in response to the read error and execute software instructions comprising the pointer modification module 310. For example, the processor module 105 may save the pointer base address and the offset in response to the interrupt and execute interrupt software instructions beginning at a specified memory location. The interrupt software instructions may direct the processor module 105 to set the pointer base address to the second base address, restore the offset, and execute the second process beginning at the address formed by the second base address and the offset.

In a certain embodiment, the interrupt is an unmaskable interrupt as is well know to those skilled in the art. The method 500 modifies the pointer base address from a first base address to a second base address, redirecting the pointer of the instruction pointer module 205 to recovery software instructions including redundant software instructions.

Figure 6:
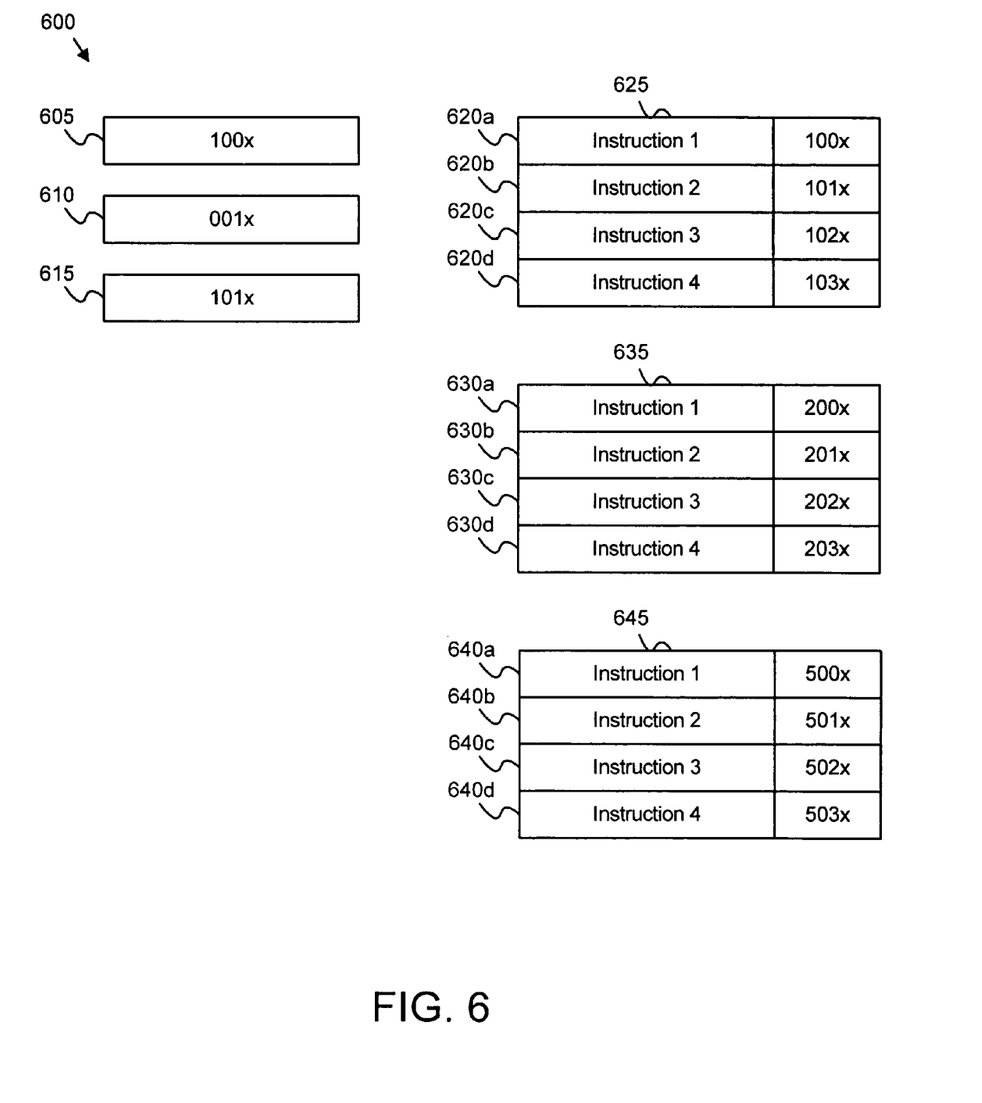
FIG. 6 is a schematic block diagram illustrating one embodiment of pointer redirection of the present invention.

FIG. 6 is a schematic block diagram illustrating one embodiment of pointer redirection 600 of the present invention. The pointer redirection 600 demonstrates the pointer redirection method 500 of FIG. 5. A load module 305 copies 505 a first process 625, a second process 635, and a third process 645 to memory locations 620, 630, 640 in a memory module 110. An instruction pointer module 205 addresses 510 'instruction 2' in a memory location 620b of the first process 625 with an address register 615. In the depicted embodiment, the address register 615 is the sum of a pointer base address register 605 and an offset register 610. The address register 615 addresses 'instruction 2' at the hexadecimal memory location '101x' 620b.

Figure 7:
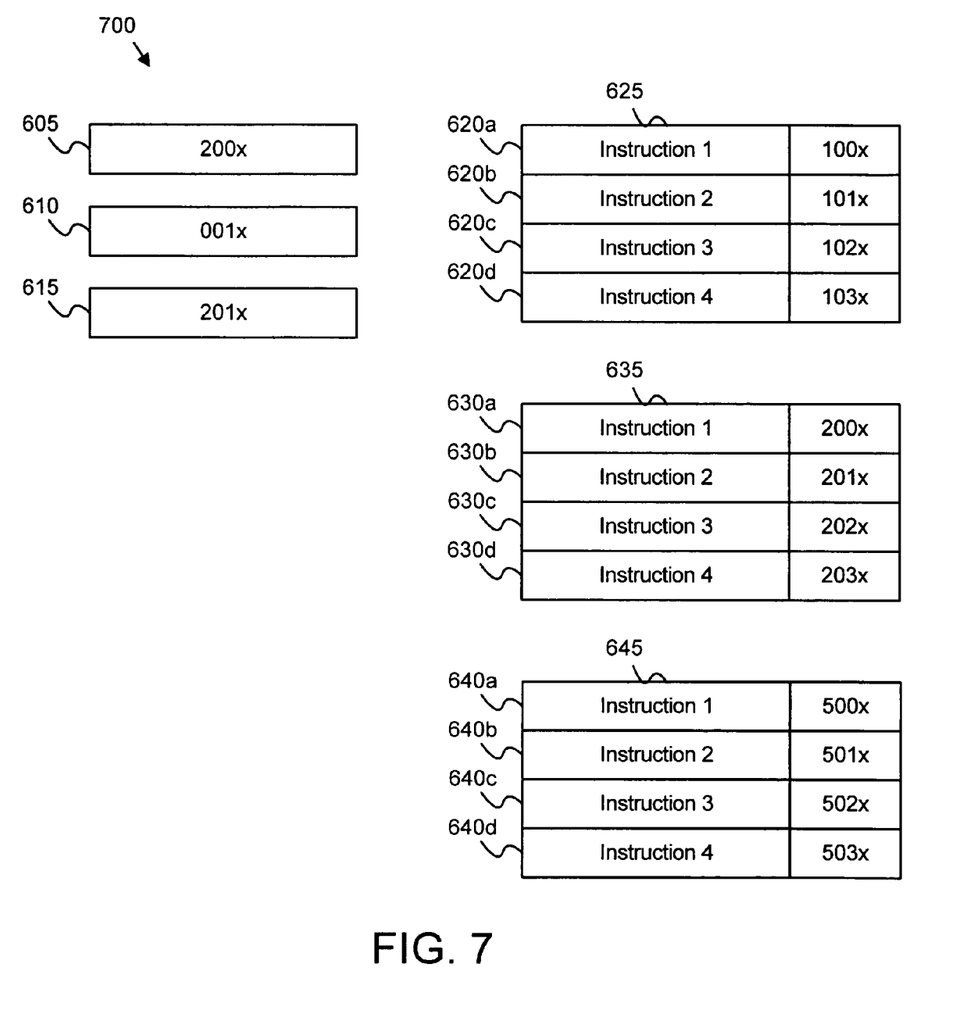
FIG. 7 is a schematic block diagram illustrating one embodiment of a redirected pointer of the present invention.

FIG. 7 is a schematic block diagram illustrating one embodiment of a redirected pointer 700 of the present invention. The redirected pointer 700 further demonstrates the pointer redirection method 500 of FIG. 5. A pointer modification module 310 determines 520 there is a read error. The read error may be an unmaskable interrupt triggered by reading invalid data from memory location 620b. The pointer modification module 310 modifies 525 the pointer base address 605 from the first base address '100x' to the second base address '200x' in response to a read error. As a result, the address register 615 addresses 'instruction 2' of the second process 635 at memory location 630b. A processor module 105 may continue to execute the second process 635 which may be identical to the first process 625 even though the first process 625 may have been loaded into one or more bad memory locations 620.

The present invention is the first to redirect an instruction pointer module 205 from a first process 625 to a second process 635 in response to a read error to allow the execution of recovery software instructions such as redundant software instructions. The present invention further supports the execution of one or more instances of a memory diagnostic process to identify and isolate bad memory locations when the processes must execute in the memory being tested. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to redirect an instruction pointer, the apparatus comprising a load module configured to copy a first memory diagnostic process comprising a plurality of software instructions for detecting and isolating bad memory to memory locations addressed with a first base address, a plurality of memory diagnostic processes comprising a plurality of software instructions for detecting and isolating bad memory to a plurality of memory locations addressed with unique base addresses, wherein the plurality of memory diagnostic processes are identical to the first memory diagnostic process, and wherein the unique base addresses are integer multiples of the first base address;

an instruction pointer module configured to address a memory location with an address comprising a pointer base address and an offset, wherein the pointer base address is set to the first base address and wherein the offset is incremented after a successful read of the instruction stored at the memory location that is the sum of the pointer base address and the offset;

a pointer modification module configured to:

modify the pointer base address from a current base address to a subsequent base address of the plurality of unique base addresses in response to a read error generated during a read operation on a current memory diagnostic process;

restore the offset to its value at the time of the read error in response to the read error generated during the read operation on the current memory diagnostic process; and modify the instruction pointer module such that the instruction pointer module addresses the memory location that is the sum of the subsequent base address and the offset, wherein an instruction stored at the memory location that is the sum of the subsequent base address and the offset is identical to an instruction at the memory location that is the sum of the current base address and the offset; and wherein the load module, instruction pointer module, and pointer modification module comprise one or more of hardware and executable code, the executable code stored on one or more computer readable media.

2. The apparatus of claim 1, wherein the plurality of memory diagnostic processes comprise a recovery process selected from the group consisting of a data protection routine, a memory diagnostic, and a processor diagnostic.

3. The apparatus of claim 1, wherein the pointer modification module comprises an interrupt.

4. The apparatus of claim 3, wherein the interrupt is a non-maskable interrupt.

5. The apparatus of claim 1, wherein the load module is further configured to copy a plurality of memory diagnostic processes, each comprising a plurality of software instructions for detecting and isolating bad memory, to memory locations that are each addressed with a base address of a plurality of base addresses, and wherein the pointer modification module is configured to modify the pointer base address from a second base address to a third base address of the plurality of base addresses responsive to a second read error.

6. A system to redirect an instruction pointer, the system comprising
  a memory module configured to store and retrieve software instructions
  a processor module configured to execute the software instructions and comprising an instruction pointer module configured to address a memory location with an address comprising a pointer base address and an offset, wherein the pointer base address is set to a first base address, and wherein the offset is incremented after a successful read of the instruction stored at the memory location that is the sum of the pointer base address and the offset;
  a load module configured to copy a first memory diagnostic process comprising a plurality of software instructions for detecting and isolating bad memory to memory locations addressed with a first base address, a plurality of memory diagnostic processes comprising a plurality of software instructions for detecting and isolating bad memory to memory locations addressed with unique base addresses, wherein the plurality of memory diagnostic processes are identical to the first memory diagnostic process, and wherein the unique base addresses are integer multiples of the first base address;
  a pointer modification module configured to:
    modify the pointer base address from a current base address to a subsequent base address of the plurality of unique base addresses in response to a read error generated during a read operation on the current memory diagnostic process;
    restore the offset to its value at the time of the read error in response to the read error generated during the read operation on the current memory diagnostic process; and
    modify the processor module such that the processor module addresses the memory location that is the sum of the subsequent base address and the offset, wherein an instruction stored at the memory location that is the sum of the subsequent base address and the offset is identical to an instruction at the memory location that is the sum of the current base address and the offset; and
  wherein the load module, processor module, and pointer modification module comprise one or more of hardware and executable code, the executable code stored on one or more computer readable media.

7. The system of claim 6, wherein the load module and the pointer modification module comprise operating system software instructions.

8. The system of claim 6, wherein the load module and the pointer modification module comprise BIOS software instructions.

9. The system of claim 6, further comprising a host computer that executes the load module and the pointer modification module.

10. A computer readable medium tangibly embodying a program of machine-readable instructions executable by a digital processing apparatus to perform operations to redirect an instruction pointer, the operations comprising:
  copying a first memory diagnostic process comprising a plurality of software instructions for detecting and isolating bad memory to memory locations addressed with a first base address and a second memory diagnostic process comprising a plurality of software instructions for detecting and isolating bad memory to memory locations addressed with a second base address, wherein the second memory diagnostic process is identical to the first memory diagnostic process, and wherein the second unique base address is an integer multiple of the first base address;
  addressing a memory location with an address comprising a pointer base address and an offset, wherein the pointer base address is set to the first base address and wherein the offset is incremented after a successful read of an instruction; and
  modifying the pointer base address from the first base address to the second base address in response to a first read error generated during a read operation on the first memory diagnostic process;
  restoring the offset to its value at the time of the read error in response to the first read error generated during the read operation on the first memory diagnostic process;
  addressing the memory location that is the sum of the second base address and the offset, wherein an instruction stored at the memory location that is the sum of the second base address and the offset is identical to an instruction at the memory location that is the sum of the first base address and the offset.

11. The computer readable medium of claim 10, the second memory diagnostic process comprising a recovery process selected from the group consisting of a data protection routine, a memory diagnostic, and a processor diagnostic.

12. The computer readable medium of claim 10, wherein the instructions to modify the pointer base address comprise an interrupt.

13. The computer readable medium of claim 12, wherein the interrupt is a non-maskable interrupt.

14. The computer readable medium of claim 10, wherein the operation further comprises copying a plurality of memory diagnostic processes, each comprising a plurality of software instructions for detecting and isolating bad memory to memory locations, that are each addressed with a base address of a plurality of base addresses, and modifying the pointer base address from the second base address to a third base address of the plurality of base addresses responsive to a second read error.

15. The computer readable medium of claim 14, wherein each of the plurality of base addresses is an integer multiple of a specified interval from the first base address.

16. A method to redirect an instruction pointer, the method comprising:

copying a first memory diagnostic process comprising a plurality of software instructions for detecting and isolating bad memory to memory locations addressed with a first base address, a plurality of memory diagnostic processes comprising a plurality of software instructions for detecting and isolating bad memory to a plurality of memory locations addressed with unique base addresses wherein the plurality of memory diagnostic processes are identical to the first memory diagnostic process, and wherein the unique base addresses are integer multiples of the first base address;

addressing a memory location with an address comprising a pointer base address and an offset wherein the pointer base address is set to the first base address and wherein the offset is incremented after a successful read of an instruction stored at a current memory location; and modifying the pointer base address from a current base address to a subsequent base address of the plurality of unique base addresses in response to a read error generated during a read operation on a current memory diagnostic process;

restoring the offset to its value at the time of the read error in response to the read error generated during the read operation on the current memory diagnostic process; and addressing the memory location that is the sum of the subsequent base address and the offset, wherein an instruction stored at the memory location that is the sum of the subsequent base address and the offset is identical to an instruction at the memory location that is the sum of the current base address and the offset.

17. An apparatus to redirect an instruction pointer, the apparatus comprising means for copying a first memory diagnostic process comprising a plurality of software instructions for detecting and isolating bad memory to memory locations addressed with a first base address, a plurality of memory diagnostic processes comprising a plurality of software instructions for detecting and isolating bad memory to a plurality of memory locations addressed with unique base addresses wherein the plurality of memory diagnostic processes are identical to the first memory diagnostic process, and wherein the unique base addresses are integer multiples of the first base address;

means for addressing a memory location with an address comprising a pointer base address and an offset, wherein the pointer base address is set to the first base address and wherein the offset is incremented after a successful read of an instruction stored at a current memory location;

means for modifying the pointer base address from a current base address to a subsequent base address of the plurality of unique base addresses in response to a read error generated during a read operation on a current memory diagnostic process;

means for restoring the offset to its value at the time of the read error in response to the read error generated during the read operation on the current memory diagnostic process; and means for addressing the memory location that is the sum of the subsequent base address and the offset, wherein an instruction stored at the memory location that is the sum of the subsequent base address and the offset is identical to an instruction at the memory location that is the sum of the current base address and the offset; and wherein the means comprise one or more of hardware and executable code, the executable code stored on one or more computer readable media.

* * * * *